Figure 1:
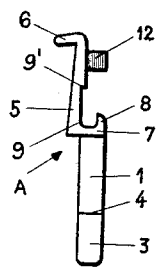

Feb. 11, 1964  S. W. BENGTSSON  3,120,971
LOCKING DEVICE
Filed June 20, 1961

INVENTOR
SIGURD WALTER BENGTSSON
By Linton and Linton

United States Patent Office 3,120,971
Patented Feb. 11, 1964

3,120,971
LOCKING DEVICE
Sigurd Walter Bengtsson, Rattgatan 6, Goteborg, Sweden
Filed June 20, 1961, Ser. No. 118,352
Claims priority, application Sweden July 8, 1960
6 Claims. (Cl. 292—91)

The present invention relates to a locking device for bags and other receptacles or the like adapted to be closed by a cover, said locking device comprising two locking members intended to be attached to one side of a side wall of the receptacle and the cover respectively, one of said locking members comprising a locking bolt connected to a fastening member and the second locking member comprising a socket or the like in which the locking bolt is adapted to releasably engage for mutual connection of the two locking members. For anchoring said socket in a simple manner it has previously been proposed to form the socket with sheet metal tongues which by their bending are connected wtih the material of the receptacle. Irrespective of the fact that this prior construction requires sheet metal, which is generally easily exposed to corrosion, the anchoring will be unsafe since the sheet metal tongues will not get any durable firm hold in the material of the receptacle. According to the invention said fastening member or socket respectively is provided at least with one pin formed at least wtih one transverse ratchet tooth, said pin being intended to pass through a hole in the side wall or cover respectively, an anchoring member having a hole for reception of the pin on the opposite side of said side wall or cover respectively a ratchet tooth being formed by said anchoring member and designed for engagement with the ratchet tooth of said pin, and at least one of said teeth being elastic enough for enabling said engagement. This device permits a reliable anchoring of the locking members which can be easily mounted on the receptacle and the cover respectively. In the use of anchoring pins of sufficient lengths and number of ratchet teeth the locking device can be anchored to the bag practically independent of the thickness of the material of the bag or the like. With anchoring means of this kind it is also possible to design said locking members in an advantageous manner so that a simple construction of the locking device is obtained which also is efficient in operation and the manipulation of which is very easy. In a locking device according to the invention the locking bolt comprises at least one resilient tongue extending substantially perpendicularly to said pin or pins and which in locking position extends through one end of said socket and by its free end portion projects through the opposite end of the socket and by means of an offset co-operates with an edge portion of the socket at this latter end and against its resilient action by the aid of the free end portion as an operating means is disengageable from said edge portion of the socket.

Other characterizing features of the invention will be disclosed by the following description with reference to the accompanying drawing showing, as examples, some embodiments of the invention.

Figure 2:
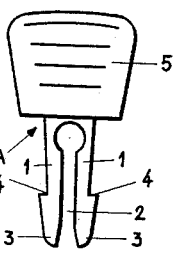
Figure 4:
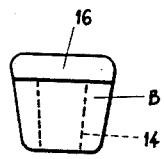
Figure 5:
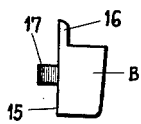
Figure 3:
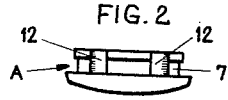
Figure 6:
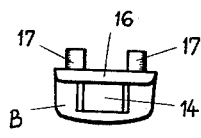
Figure 7:
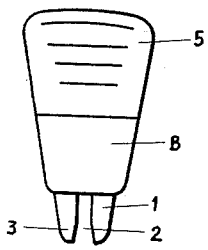
Figure 8:
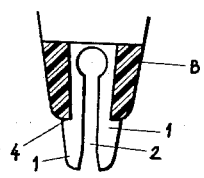
Figure 9:
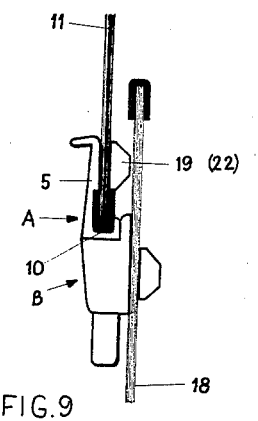
Figure 10:
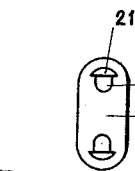
Figure 11:
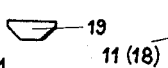
Figures 12, 13, 14, 15:
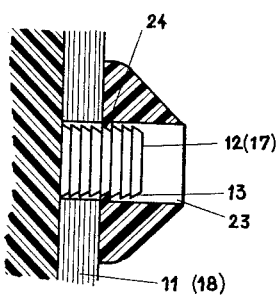

FIGS. 1, 2 and 3 show the one locking member in three projections perpendicular to each other, and FIGS. 4, 5 and 6 are similar views of the second locking member. FIG. 7 is a front view of the locking members engaging with each other. FIG. 8 is a similar partial view of the locking device with said second member or socket in axial section. FIG. 9 is a side view of the locking device connecting two parts. FIGS. 10 and 11 are views of an anchoring member in vertical and horizontal projection respectively. FIG. 12 is a vertical section on a larger scale showing anchoring members engaging with each other. FIGS. 13 and 14 are views corresponding to FIGS. 10 and 11 respectively of an anchoring member of another design, and FIG. 15 is a sectional view on a larger scale illustrating this anchoring member in engagement with a corresponding anchoring member of the locking device.

The one locking member A of FIGS. 1 to 3 presents a locking bolt formed by two tongues 1 separated from each other by a longitudinal slot 2 of a suitable width permitting the tongues 1, which are made from flexible, elastic material, to be forced against each other against the springy action thereof by a pressure on the free end portions 3 of the tongues. On the side opposite to the slot 2 the two tongues 1 are stepped as shown at 4 so that the ends of the tongues are hook-shaped. A fastening head or member 6 is formed integrally with the locking bolt 1, said member or head being formed as a plate having in vertical section substantially Z-shape, the upper edge flange 6 of the head being designed to serve as a small handle. The lower edge of the cover 11 of the bag or the like is provided with a lining 10 which is received in a corresponding groove 9 in the fastening head, the bottom of said groove being limited by the lower flange 7 of the Z-shaped head. The extreme end of this flange presents an upright edge 8 serving as a lateral support for the lining 10, and for the upper edge of this lining an offset 9' is provided in the intermediate portion of the head 5, said offset forming the top end of one side of the groove 9, so that the lining 10 has the support required in the groove 9. The fastening head 5 is provided with at least one or preferably two (or more) substantially horizontal pins 12 having on one or more sides or all around transverse grooves or teeth 13. These pins are designed to serve as anchoring means for the locking device to the bag or the like as stated below. The groove 9 is positioned between the pin or pins 12 and the root end of the bolt or tongues 1.

The second locking member comprises a socket B shown alone in FIGS. 4–6 and having a through hole 14 of conical or wedge shape. This socket presents a preferably plane outer surface 15 which is extended upwards by a flange 16. Said plane outer surface is formed with pins 17 of the same kind as the pins 12 projecting substantially perpendicularly from the surface 15 and provided at the same mutual distance as the distance between the pins 12.

The one locking member A is anchored to the cover 11 and the second locking member B is anchored to the front side wall portion 18 surrounding the opening of the bag, as indicated by FIG. 9. The anchoring means co-operating with the pins 12, 17 may be of different performance. According to FIGS. 10 and 11 said means comprises a washer or plate 19 having two holes 20. At the one side of this washer or plate and at the end of each hole 20 a somewhat elastic ratchet tooth 21 is provided. The pair of pins 12 or 17 may be inserted in the holes 20 of the washer 19 so that the ratchet tooth 21 engages with one of the grooves or teeth 13 corresponding to the thickness of the material of the cover 11 or the side walls 18. By choosing suitable length of the pins and number and mutual distance of the teeth 13 anchoring members of the same performance and dimensions for different thicknesses of the material of the bag or the like can be used.

According to FIGS. 13–15 a separate anchoring member for each pin 12, 17 is used. This anchoring member has the shape of a sleeve or washer 22 the wall of the through hole 23 of said sleeve or washer at one end of this hole being formed with a ratchet tooth 24, acting in a similar manner as the ratchet tooth 21 of FIGS. 10 to 12. In both cases the teeth 13 may extend across one side or a greater portion of or all around the pin. The latter is the case as regards the embodiment of FIGS. 13 to 15 in which also the ratchet tooth 24 extends all round the opening 23.

The two locking members A and B are united by inserting the tongues 1 into the wider opening of the hole 14 of the socket B, the tongues in this movement being guided by the flange 16. The free ends 3 of the tongues will be forced together against their resilient action until the offsets 4 have passed beyond the narrower end of the through hole of the socket and are swung to normal engaging position owing to their elastic character, as clearly shown in FIG. 8. By the co-operation between the offsets 4 and the lower end surface of the socket the tongues are then retained in the locking position. For the opening of the cover 11 the free ends 3 of the tongues are forced together so that they are disengaged from the lower end of the socket 8 and can be pushed upwards out of said socket thus releasing the two locking members A and B from each other. When forcing the tongues together the forces act in opposite directions parallel with the cover or the sidewall of the bag, and consequently said forces do not tend to bend the cover or sidewall inwards.

The pins 12 and 17 are preferably formed integrally with the locking member A or B respectively. Each locking member with pin or pins is preferably made from suitable plastic material.

The invention is not restricted to the forms of the details shown in the drawing. Each anchoring member 19, 22 may, for example, have two or more ratchet teeth 21, and the teeth 13 of the anchoring member 12 or 17 may also or instead of the tooth 21 have the resilient properties required for engaging the anchoring members with each other.

Though in the following claims the present locking device is said to be used for "bags" it is to be understood, that the claims are intended to cover all other uses of the locking device such as receptacles of various kinds and other articles for which the same locking device may be used with similar advantages.

What I claim is:

1. A locking device for bags having a cover for closing the opening thereof, said locking device comprising a pair of locking members, said members being adapted to be secured to the side wall of the bag and to the cover thereof respectively, one of said locking members comprising a resilient hook-shaped locking bolt and a fastening member formed integrally with said locking bolt, an offset being formed by said fastening member, said hook-shaped locking bolt extending from said offset, the second of said locking members comprising a locking socket having a through hole for reception of said locking bolt with said through hole having an entrance opening at one end and an exit opening for said locking bolt at the opposite end of the socket, said fastening member adapted in the locking position of the bolt to bear by said offset against the entrance opening end of the locking socket and to engage by its hook with the exit opening end of said socket for preventing relative longitudinal movement of said socket and said bolt in the locking position of the latter in both longitudinal directions of said socket, and a free end portion of said locking bolt in its locking position extending out of the exit end of said through hole.

2. A locking device as claimed in claim 1 wherein said fastening member has a flange with said offset being formed by one side of said flange, and the opposite side of said flange forming a groove for reception of an edge portion of the cover.

3. A locking device as claimed in claim 1 wherein siad locking socket through hole tapers inwardly from said entrance opening to the exit opening of said hole.

4. A locking device as claimed in claim 1 wherein said locking socket through hole tapers inwardly from said entrance opening thereof, and a flange is formed integrally with said socket adjacent said entrance opening and adapted to guide said hook-shaped locking bolt when inserted into said entrance opening.

5. A locking device for bags having a cover for closing the opening thereof, said locking device comprising a pair of locking members capable of being attached to the side and the cover of the bag respectively, one of said locking members comprising a resilient hook-shaped locking bolt and a fastening member formed integrally wtih said locking bolt, the second of said locking members comprising a locking socket with a through hole for reception of said locking bolt with said through hole having an entrance opening at one end and an exit opening at the opposite end for said locking bolt, at least one anchoring pin being formed integrally with each of said two locking members respectively, at least one transverse ratchet tooth being formed on said pin, said pin with ratchet tooth adapted to extend through the side and cover of the bag respectively, an anchoring member having a hole for reception of said pin on the opposite side of said bag side and cover respectively, a ratchet tooth being formed by said anchoring member positioned for engagement with the ratchet tooth of said anchoring pin, at least one of said teeth being elastic for enabling said engagement, an offset on said fastening member adapted in the locking position of said bolt to bear against the entrance opening end of said socket, said locking bolt in said locking position adapted to engage by its hook with the exit opening end of said socket, and a free end portion of said hook-shaped locking bolt in locking position extending out of said exit end of said socket permitting operation of the bolt for moving it out of locking engagement with said socket.

6. A locking device as claimed in claim 1 wherein said hook-shaped locking bolt comprises a pair of tongues spaced apart by a longitudinally extending slot between opposing sides of asid tongues and each tongue has a stepped side on the side thereof opposite said slot with said steps positioned to engage the exit end of said locking socket when said locking bolt extends through said locking socket.

References Cited in the file of this patent

UNITED STATES PATENTS

| | | |
|---|---|---|
| 932,806 | Paulson | Aug. 31, 1909 |
| 1,849,604 | Weatherhead | Mar. 15, 1932 |
| 2,478,434 | Swanson | Aug. 9, 1949 |